(12) United States Patent
Lajewardi et al.

(10) Patent No.: US 12,085,107 B2
(45) Date of Patent: Sep. 10, 2024

(54) STRUCTURAL SCREW

(71) Applicant: THE HILLMAN GROUP, INC., Cincinnati, OH (US)

(72) Inventors: Farhad Lajewardi, Toronto (CA); Dale G. Malott, Gilbert, AZ (US)

(73) Assignee: THE HILLMAN GROUP, INC., Forest Park, OH (US)

( * ) Notice: Subject to any disclaimer, the term of this patent is extended or adjusted under 35 U.S.C. 154(b) by 254 days.

(21) Appl. No.: 17/699,536

(22) Filed: Mar. 21, 2022

(65) Prior Publication Data

US 2022/0316514 A1    Oct. 6, 2022

Related U.S. Application Data

(60) Provisional application No. 63/167,809, filed on Mar. 30, 2021.

(51) Int. Cl.
   *F16B 25/00* (2006.01)
   *F16B 25/10* (2006.01)

(52) U.S. Cl.
   CPC ...... *F16B 25/0057* (2013.01); *F16B 25/0015* (2013.01); *F16B 25/0052* (2013.01); *F16B 25/0084* (2013.01); *F16B 25/103* (2013.01)

(58) Field of Classification Search
   CPC .............. F16B 25/0057; F16B 25/0015; F16B 25/0052
   USPC ........................... 411/386, 387.1, 387.2, 412
   See application file for complete search history.

(56) References Cited

U.S. PATENT DOCUMENTS

| | | | | |
|---|---|---|---|---|
| 471,179 | A | * | 3/1892 | Jones ...................... F16B 4/004 411/424 |
| 3,942,405 | A | * | 3/1976 | Wagner ............... F16B 25/0084 411/386 |
| 4,536,117 | A | * | 8/1985 | Yamashiro .......... F16B 25/0047 411/411 |
| 6,113,331 | A | * | 9/2000 | Grossberndt ....... F16B 25/0073 411/387.4 |
| 6,152,666 | A | * | 11/2000 | Walther .............. F16B 25/0052 411/311 |
| 6,213,700 | B1 | | 4/2001 | Everard |
| 6,394,725 | B1 | | 5/2002 | Dicke |
| 6,394,726 | B1 | | 5/2002 | Garvick |
| 6,443,680 | B1 | | 9/2002 | Bodin |
| 6,444,950 | B1 | | 9/2002 | Altekruse |
| 6,702,537 | B2 | | 3/2004 | Neuhengen |
| 6,726,420 | B2 | | 4/2004 | Ward |
| 6,789,989 | B2 | | 9/2004 | Walther |

(Continued)

*Primary Examiner* — Flemming Saether
(74) *Attorney, Agent, or Firm* — THOMPSON HINE LLP

(57) ABSTRACT

A structural screw usable in multiple different substrates/materials includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and terminates at a first axial location along the shank that is spaced from the head end. The thread (i) is a multiple start thread formed by at least a first helical thread and a second helical thread and/or (ii) includes a thread angle of between fifteen degrees and thirty degrees. The screw may also include a reaming section with leading and trailing wedge sections and/or an asymmetric notch pattern along at least part of the thread edge.

19 Claims, 16 Drawing Sheets

(56) References Cited

U.S. PATENT DOCUMENTS

| | | |
|---|---|---|
| 6,933,465 B2 | 8/2005 | Bankstahl |
| 6,974,289 B2 | 12/2005 | Levey |
| 7,101,132 B2 | 9/2006 | Hofschneider |
| 7,101,133 B2 | 9/2006 | Dicke |
| 7,207,248 B2 | 4/2007 | Panasik |
| 7,293,947 B2 * | 11/2007 | Craven ................ F16B 35/048 411/399 |
| 7,326,014 B2 | 2/2008 | Levey |
| 7,334,976 B2 | 2/2008 | Dicke |
| 7,377,734 B2 | 5/2008 | Bechtel, Jr. |
| 7,402,016 B2 | 7/2008 | Yin-Feng |
| 7,402,109 B2 | 7/2008 | Bechtel, Jr. |
| 7,517,182 B2 | 4/2009 | Cabrele |
| 7,677,854 B2 | 3/2010 | Langewiesche |
| 7,682,118 B2 | 3/2010 | Gong |
| 7,874,113 B2 | 1/2011 | Eberle, III |
| 8,137,042 B2 | 3/2012 | Severns |
| 8,348,575 B2 | 1/2013 | Walther |
| 8,511,958 B2 * | 8/2013 | Chang ................ F16B 25/103 411/387.7 |
| 8,555,597 B2 | 10/2013 | Walther |
| 8,591,159 B2 | 11/2013 | Walther |
| 8,789,809 B2 | 7/2014 | Lehmann |
| 9,046,121 B2 | 6/2015 | Walther |
| D733,546 S | 7/2015 | Balzhiser |
| 9,086,088 B2 | 7/2015 | Walther |
| 9,482,258 B2 * | 11/2016 | Park .................... F16B 25/0063 |
| 9,494,179 B2 | 11/2016 | Langewiesche |
| 9,630,729 B2 | 4/2017 | Samaras |
| 9,970,470 B2 * | 5/2018 | Shih ................... F16B 25/0015 |
| D823,102 S | 7/2018 | Camilleri |
| D828,148 S | 9/2018 | Camilleri |
| 10,480,559 B2 | 11/2019 | Park |
| 10,954,986 B2 * | 3/2021 | Ruhmann ............ F16B 25/106 |
| 10,954,989 B2 * | 3/2021 | Lucas ................. F16B 25/0078 |
| 11,149,776 B2 * | 10/2021 | Hu ....................... F16B 25/106 |
| 11,181,138 B2 * | 11/2021 | Park .................... F16B 25/0063 |
| 11,359,661 B2 * | 6/2022 | Dissing ................ F16B 35/041 |
| 11,391,314 B2 * | 7/2022 | Chen ................... F16B 25/0063 |
| D996,962 S * | 8/2023 | Schwartzkopf ................ D8/387 |
| 2007/0172333 A1 * | 7/2007 | Tsau .................... F16B 25/0031 411/378 |
| 2008/0145182 A1 * | 6/2008 | Gstach ............... F16B 25/0047 411/403 |
| 2012/0063865 A1 * | 3/2012 | Huang ............... F16B 25/0047 411/393 |
| 2016/0238053 A1 | 8/2016 | Lajewardi |
| 2016/0273573 A1 | 9/2016 | Hill |
| 2017/0122356 A1 | 5/2017 | Lajewardi |
| 2017/0284447 A1 | 10/2017 | Falkenstein |
| 2018/0202479 A1 | 7/2018 | Krueger |
| 2019/0063480 A1 | 2/2019 | Lajewardi |
| 2019/0136897 A1 | 5/2019 | Lajewardi |
| 2019/0203756 A1 | 7/2019 | Langewiesche |
| 2019/0309784 A1 | 10/2019 | Lajewardi |
| 2019/0390700 A1 | 12/2019 | Iyer |
| 2020/0173481 A1 | 6/2020 | Lajewardi |
| 2022/0056942 A1 * | 2/2022 | Dissing ............... F16B 25/0015 |

* cited by examiner

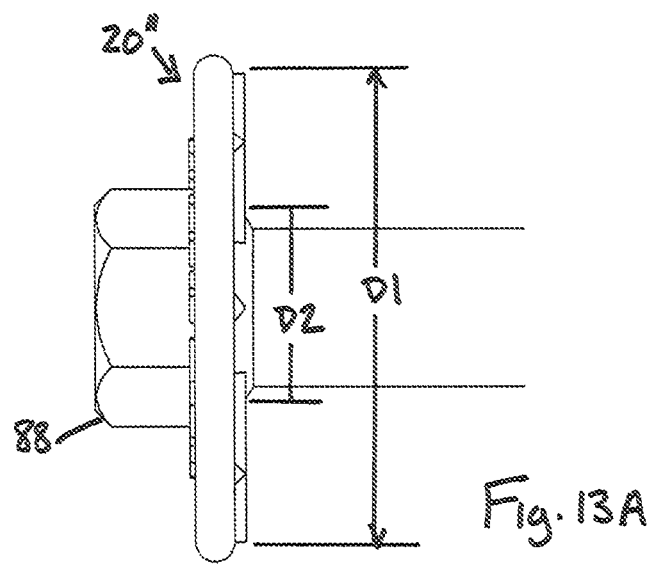
Fig. 13A
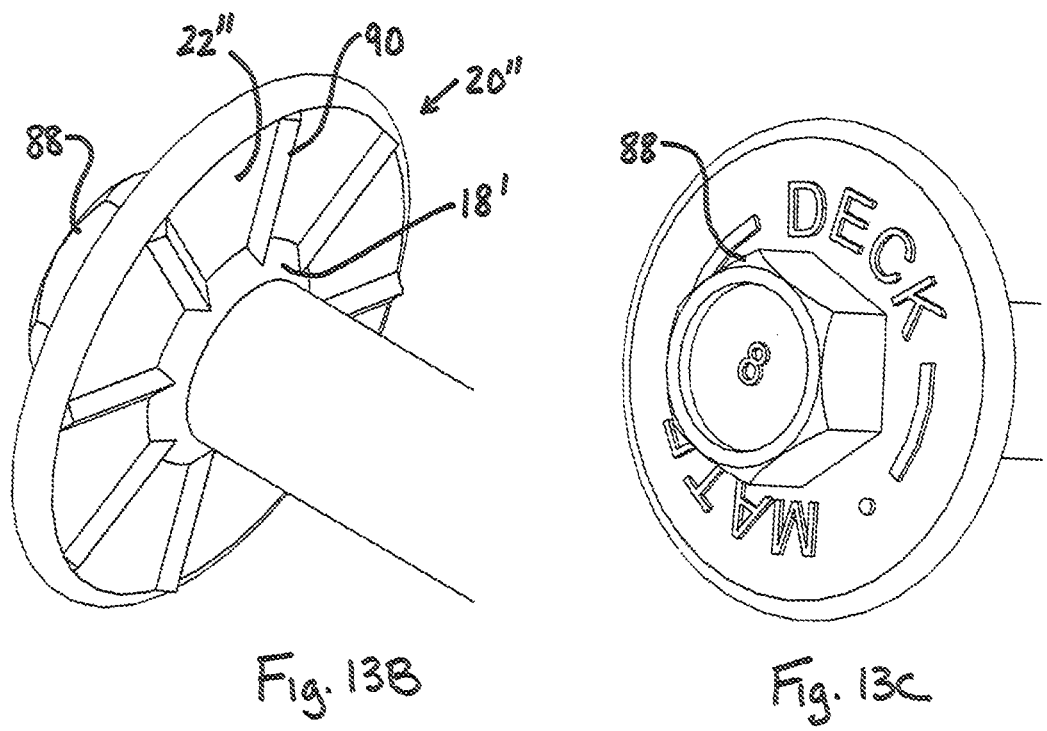
Fig. 13B
Fig. 13C

STRUCTURAL SCREW

TECHNICAL FIELD

This application relates generally to threaded fasteners and, more particularly, to a structural screw for use in heavy duty applications.

BACKGROUND

A typical screw configuration includes an elongated shank that extends between a driving head of the screw and a pointed end of the screw. At least part of the shank is helically threaded. Contractors installing structural screws regularly encounter issues with excessive torque required to install, which requires more work by the operator and reduces battery life in the case of battery powered screw guns. Contractors also seek the ability to reduce the time needed to drive such screws. In addition, improved performance in structural screws is regularly sought, including pull through performance and thread strength.

It would be desirable to provide a structural screw configuration that addresses one or more of such issues.

SUMMARY

In one aspect, a screw includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and terminates at a first axial location along the shank that is spaced from the head end. A reaming section is located along the shank and runs from proximate to the first axial location and toward the head end, the reaming section including projections thereon, wherein the reaming section comprises a first segment with a repeating pattern of rotationally leading wedge projections and rotationally trailing wedge projections.

In another aspect, a screw usable in multiple different substrates/materials includes head end, a shank and a tapered end, the head end including a tool engaging part, the head end located at a first end of the shank and the tapered end located at a second end of the shank. A thread is formed along the shank, wherein the thread begins on the tapered end, extends onto the shank and terminates at a first axial location along the shank that is spaced from the head end, wherein: the thread is a multiple start thread formed by at least a first helical thread and a second helical thread and/or the thread includes a leading flank and a trailing flank that define a thread angle of between fifteen degrees and thirty degrees.

In a further aspect, a structural screw usable in multiple different substrates/materials includes a head end, a shank and a tapered end, the head end including a tool engaging part, the head end located at a first end of the shank and the tapered end located at a second end of the shank. A thread is formed along the shank, wherein the thread begins on the tapered end, extends onto the shank and terminates at a first axial location along the shank that is spaced from the head end, wherein: the thread is a multiple start thread formed by at least a first helical thread and a second helical thread, and the first helical thread includes a first leading flank and a first trailing flank that define a first thread angle of between fifteen degrees and thirty degrees, and the second helical thread includes a second leading flank and a second trailing flank that define a second thread angle of between fifteen degrees and thirty degrees, and the first helical thread includes a first peripheral edge and a first initial axial segment comprising multiple thread turns and along which the first peripheral edge includes a first plurality of notches and a first following axial segment comprising multiple thread turns and along which the first peripheral edge lacks any notches, wherein the first initial segment begins on the tapered end, wherein the first plurality of notches along first the initial axial segment are formed with a first asymmetric spacing pattern through each thread turn of the first initial axial segment, and the second helical thread includes a second peripheral edge and a second initial axial segment comprising multiple thread turns and along which the second peripheral edge includes a second plurality of notches and a second following axial segment comprising multiple thread turns and along which the second peripheral edge lacks any notches, wherein the second initial segment begins on the tapered end, wherein the second plurality of notches along the second initial axial segment are formed with a second asymmetric spacing pattern through each thread turn of the second initial axial segment.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 13A-13C show views of another alternative head configuration.

DETAILED DESCRIPTION

Figure 1:
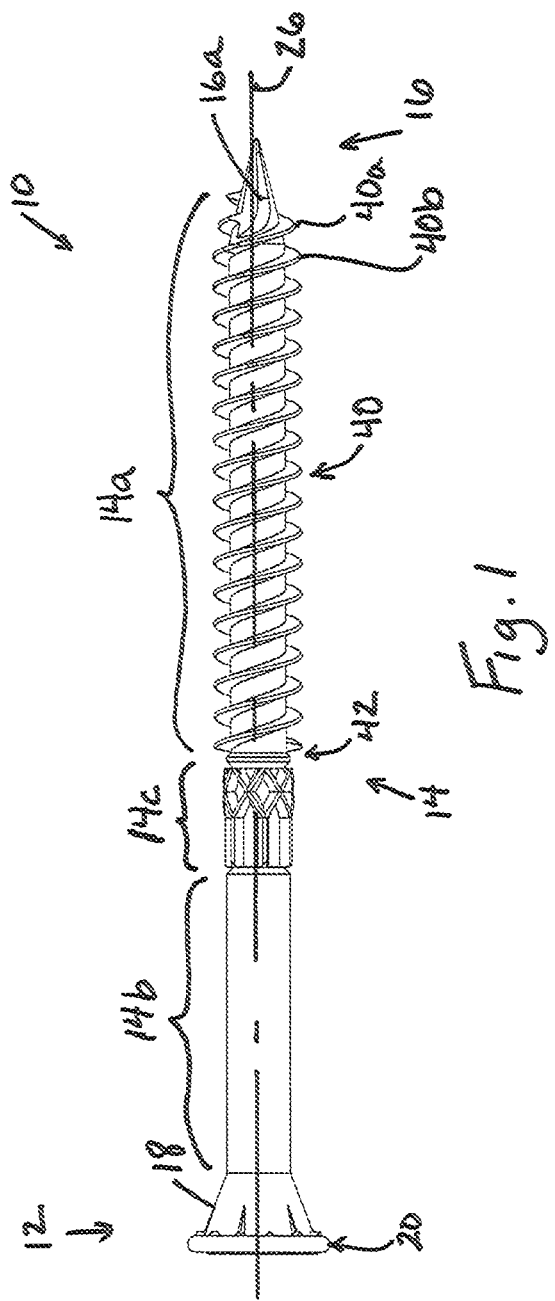
FIG. 1 shows a side elevation view of one embodiment of a structural screw.
Figure 2:
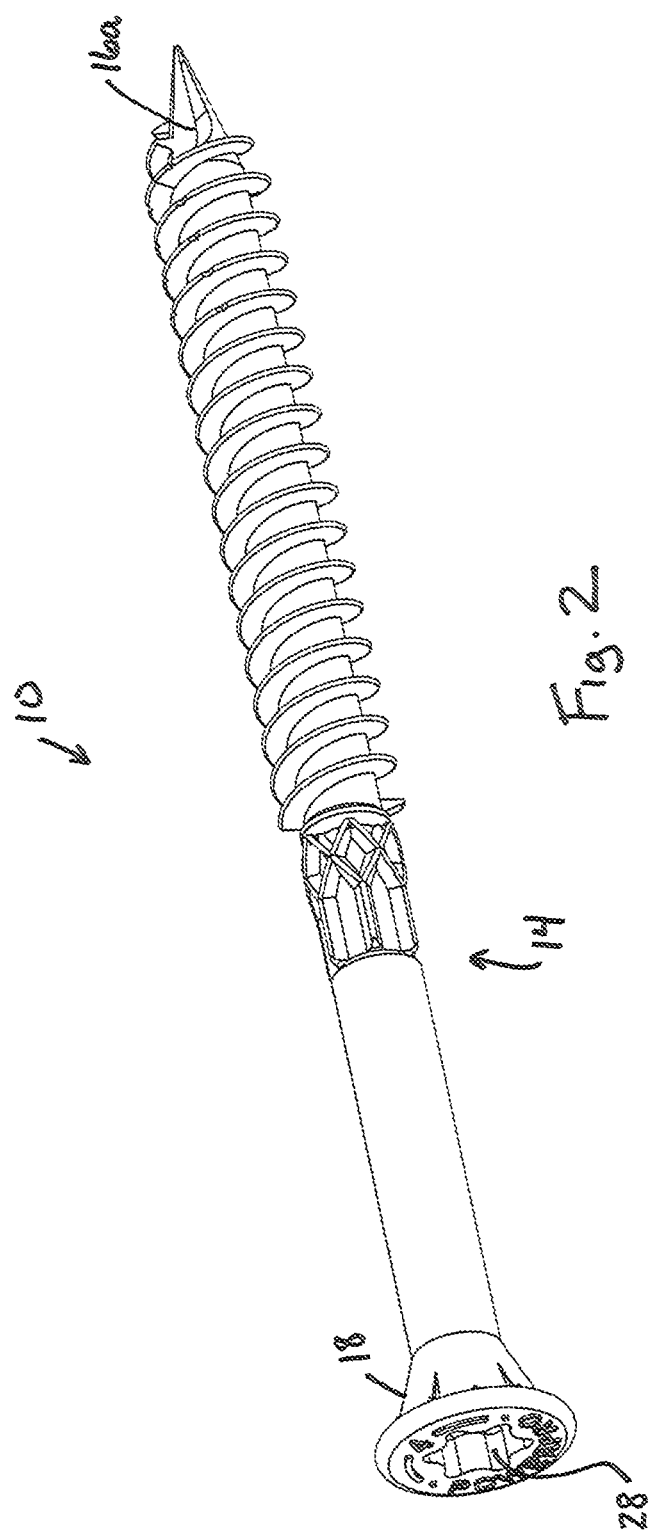
FIG. 2 shows a perspective view of the screw.
Figure 3:
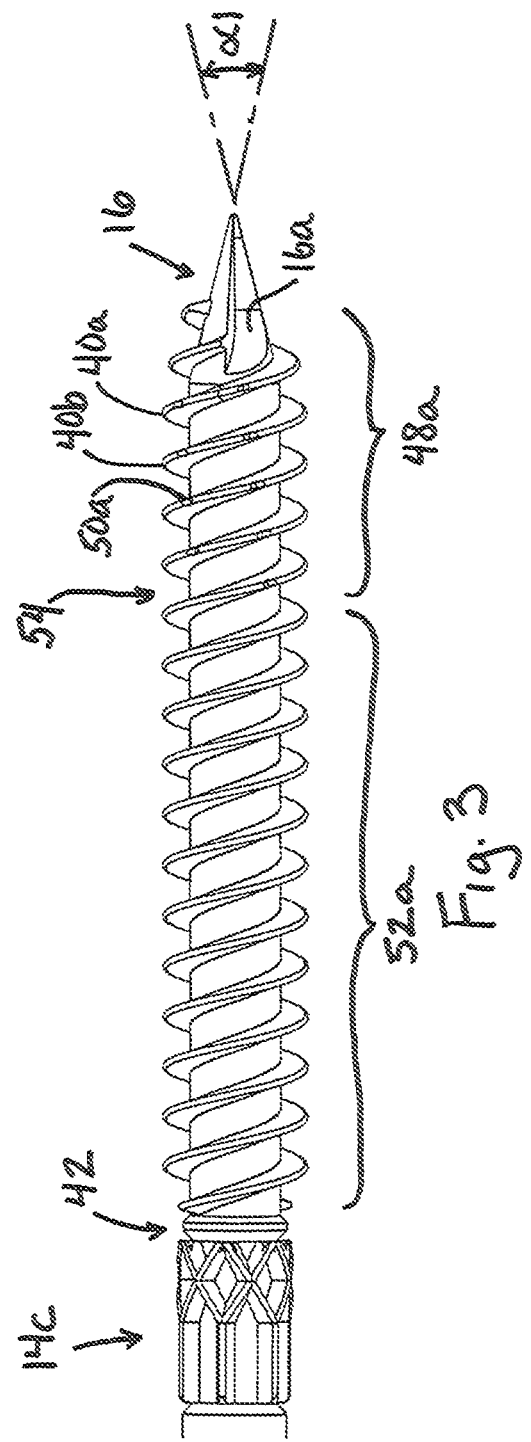
FIG. 3 shows a partial side elevation view of the screw.
Figure 4:
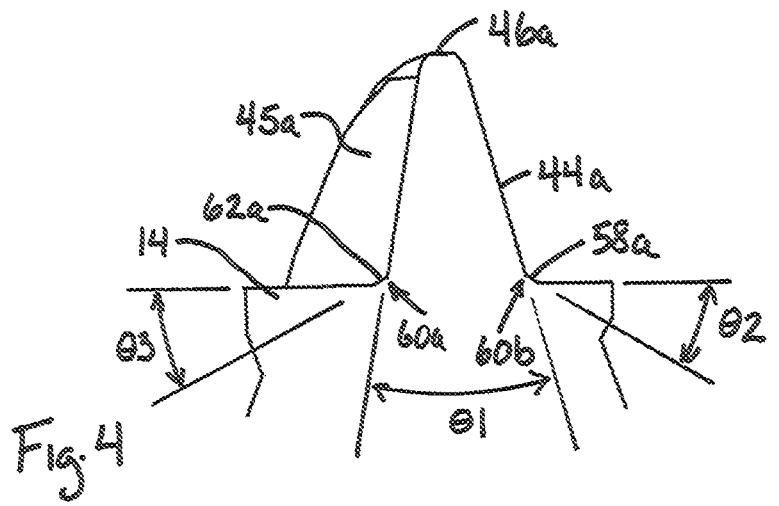
FIG. 4 shows a cross-section of a thread segment of the screw taken along a plane in which the screw axis lies.
Figure 5:
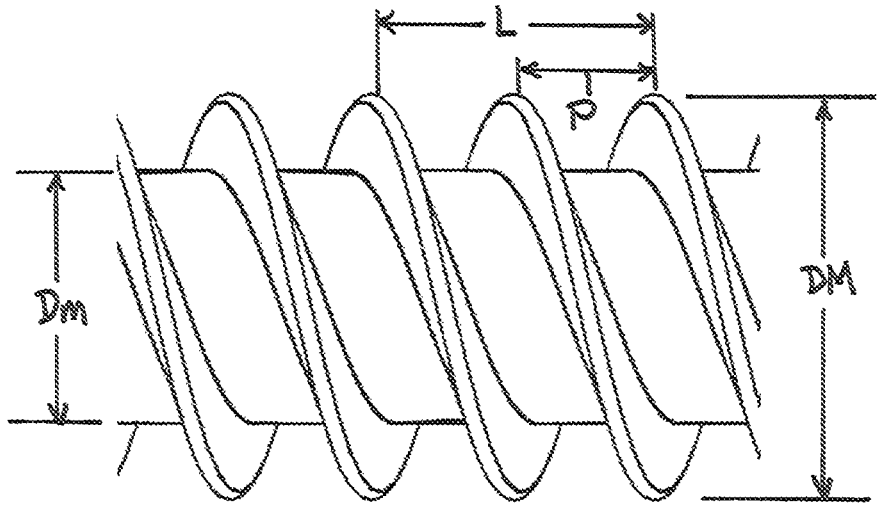
FIG. 5 shows a partial side elevation of the screw.
Figure 6A:
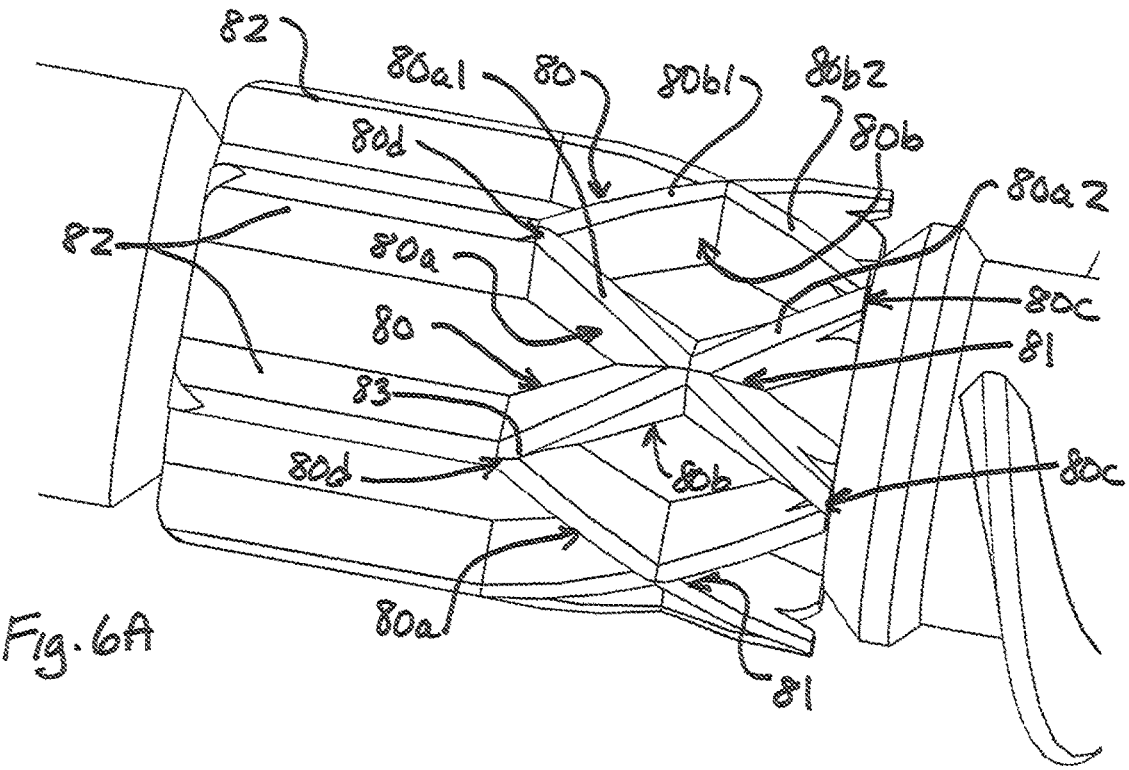
FIGS. 6A and 6B show a reaming section of the screw.
Figure 6B:
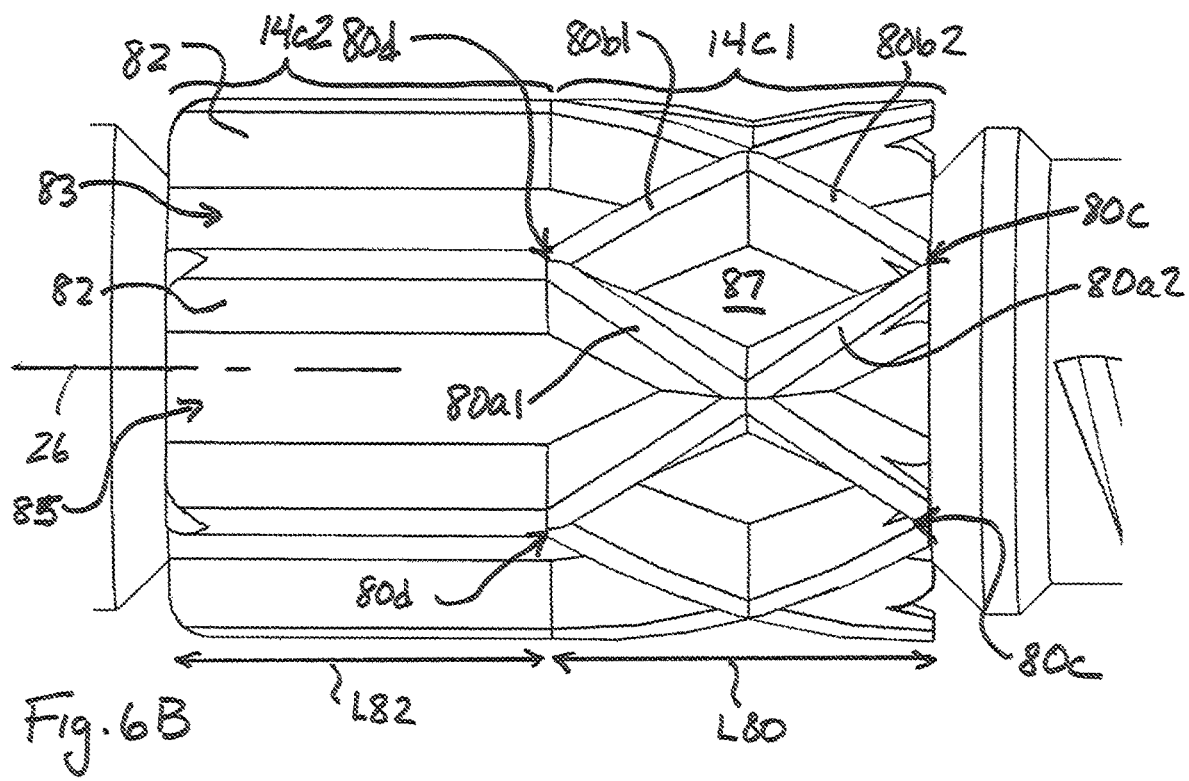
Figure 7:
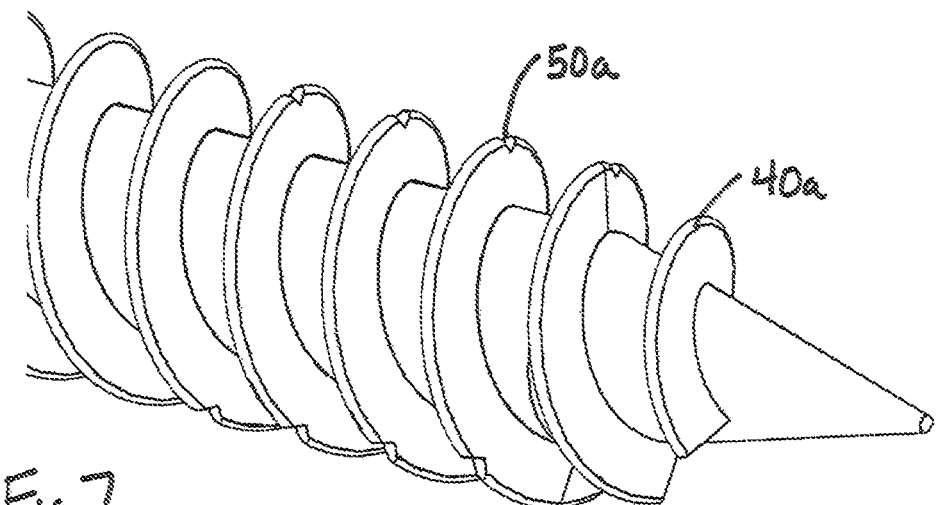
FIG. 7 shows a tip end portion of the screw.
Figure 8:
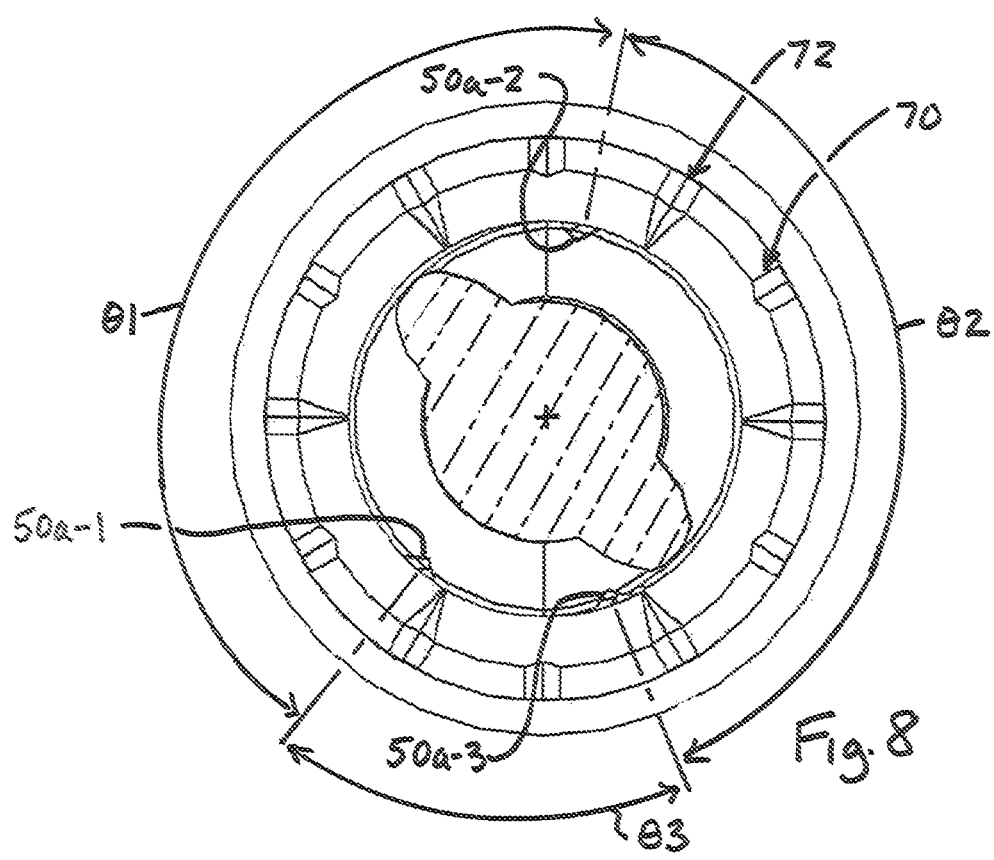
FIG. 8 shows a cross-section of the screw taken in a plane perpendicular to the screw axis and looking toward the head end.

Referring to FIGS. 1-10, one embodiment of a structural screw 10 is shown. The structural screw includes a head end 12, a shank or core 14 and a tapered end 16, with the head end 12 at one end of the shank 14 and the tapered end 16 at the opposite end of the shank 14 and terminating in a pointed tip. As used herein, the term shank refers to the elongated core or shaft of the screw, which can include threaded and unthreaded portions or segments. Here, the tapered end 16 includes a cut 16a (e.g., a type 17 cut running from the tip toward the shank). The tip angle or point angle α1 may be between twenty-two degrees and thirty degrees.

The head end 12 includes a frustoconical neck 18 running from the end of the shank to a head cap 20, and the head cap 20 defines an annular ledge 22 facing the tapered end 16 and lying in a plane 24 that is perpendicular to a central axis 26 of the shank 14. An end face of the head cap includes a tool engaging part 28, here in the form of a drive recess.

The shank 14 includes threaded axial segment 14a and an unthreaded axial segment 14b, as well as an intermediate reaming section 14c. Here, the diameter of unthreaded axial segment 14b is slightly larger than a diameter of the threaded axial segment 14a. A thread 40 is formed along the shank, and begins on the tapered end 16, extends onto the shank 14 and terminates at an axial location 42 that is spaced from the head end 12. Advantageously, the thread 40 is a multiple start thread (aka multiple lead thread), here a dual start thread, formed by a pair of helical threads 40a and 40b. The helical threads 40a and 40b are of identical configuration, but are rotationally offset from each other by one-hundred eighty degrees. Accordingly, the description below regarding the configuration of helical thread 40a is understood to equally apply to the helical thread 40b.

The helical thread 40a includes a leading flank 44a, a trailing flank 45a and a peripheral edge 46a joining the leading flank and the trailing flank. The helical thread 40a includes an initial axial segment 48a, comprising multiple thread turns, and along which the peripheral edge 46a includes a plurality of notches 50a, and a following axial segment 52a, comprising multiple thread turns, and along which the peripheral edge 46a lacks any notches. The initial segment 48a begins on the tapered end 16 and runs to an axial location 54 along the shank 14 that is between the tapered end 16 and the axial location 42. The helical thread 40a is a symmetric angle thread, with a sharp thread angle θ1 of between fifteen degrees and thirty degrees (e.g., between 20 degrees and 30 degrees or between 20 degrees and 29 degrees). In some embodiments, the angle of the thread could be asymmetric (e.g., trailing flank angle different than leading flank angle).

In embodiments, a leading flank transition zone 56a from the shank 14 to the leading flank 44a includes a leading chamfer 58a that defines a leading chamfer angle θ2 of between twenty-five degrees and thirty-five degrees relative to the central axis of the shank, and a trailing flank transition zone 60a from the shank 14 to the trailing flank 45a includes a trailing chamfer 62a that defines a trailing chamfer angle θ3 of between twenty-five degrees and thirty-five degrees relative to the central axis of the shank. The chamfers could, in some embodiments, be combined with fillets at each end of the chamfer.

The helical threads 40a, 40b include a major diameter DM and a minor diameter Dm. In one example, the major diameter DM is between 0.275 inches and 0.295 inches, and the minor diameter Dm, which is the same as the diameter of the section of the shank along with the threads extend, is between 0.170 inches and 0.190 inches. In another example, the major diameter DM is between 0.230 inches and 0.250 inches, and the minor diameter Dm is between 0.150 inches and 0.165 inches. In yet another example, the major diameter DM is between 0.310 inches and 0.330 inches, and the minor diameter Dm is between 0.185 inches and 0.200 inches.

The pitch P of thread 40 may, for example, be between about 0.130 inches and 0.150 inches, such as between 0.135 inches and 0.145 inches. Because thread 40 is a dual start thread, the lead L of the thread is twice the pitch P.

With respect to the notching on the initial axial segment of each helical thread 40a, 40b (e.g., the notches along initial axial segment 48a of thread 40a), the notches are formed with an asymmetric spacing pattern through each thread turn of the initial axial segment. As used herein, the term "thread turn" refers to a helical extent of the thread that moves angularly through three-hundred sixty degrees about the central axis 26. Here, the asymmetric pattern is defined by three notches 50a-1, 50a-2 and 50a-3 along each thread turn of the helical thread. Notably, in end view from the tapered end, a center of the notch 50a-1 is angularly spaced from a center of the next notch 50a-2 by an angle φ1 of between about one-hundred forty degrees and about one-hundred sixty degrees (e.g., between 145° and 155°, such as about 150°), a center of the notch 50a-2 is angularly spaced from a center of the notch 50a-3 by an angle φ2 of between about one-hundred forty degrees and about one-hundred sixty degrees (e.g., between 145° and 155°, such as about 150°), but a center of the notch 50a-3 is angularly spaced from the center of the notch 50a-1 by an angle φ3 that is only between about forty degrees and about eighty degrees (e.g., between 50° and 70°, such as about 60°).

Here, the head configuration of the screw 10 is a wafer-type configuration, with a frustoconical neck 18 joining the shank 14 to the head cap 20. In addition, a plurality of nibs 70, 72 run from the neck 18 to the annular face 22, with nibs 70 and 72 alternating with each other and with a uniform angular spacing between the sequential nibs. Each nib 70 is formed as a triangular prism structure that extends radially outward and has an inner end 70a abutting the neck 18 and an outer end 70b located at the outer perimeter of the annular face 22. Leading and trailing sides 70c and 70d of the structure intersect the annular surface at substantially the same angle α2, which may be between about 35 and 55 degrees. Each nib 72 is formed by the combination of a triangular prism structure 72a and an axially and radially extending structure 72b formed by intersecting sides 72c and 72d and having a height and width that reduce when moving along the neck 18 toward the shank 14. Here, the axial length L72 the nibs 72 is between 40% and 60% of the axial length L18 of the neck 18. The combination of alternating nibs 70 and 72 provides an advantage of better countersink.

The reaming section 14c of the screw shank includes a unique projection configuration, formed here by a first segment 14c1 having a set of circumscribing diamond projections 80 from which straight projections 82 extend to form a second segment 14c2. Each diamond projection 80 includes a rotationally leading wedge section 80a, which points in the direction of rotational install, and a rotationally trailing wedge section 80b, which points opposite the direction of rotational install. The rotationally leading side or point of each rotationally leading wedge section 80a abuts or is joined to the rotationally trailing side or point of the rotationally trailing wedge section 80b of the rotationally preceding diamond-shaped projection, per regions 81. For each diamond projection 80, the rotationally trailing side or open side of the rotationally leading wedge section 80a abuts or is joined to the rotationally leading side or open side of the rotationally trailing wedge section 80b, per regions 83.

Here, each rotationally leading wedge section 80*a* is formed by converging and intersecting walls 80*a*1 and 80*a*2, and each rotationally trailing wedge section 80*b* is formed by converging and intersecting walls 80*b*1 and 80*b*2, where the walls 80*a*1, 80*a*2, 80*b*1 and 80*b*2 are collectively oriented to define a diamond shape. The internal region 87 of each diamond projection is recessed relative to the walls forming the diamond-projection. In the illustrated embodiment, each straight projection 82 connects to a respective diamond projection 80 and extends substantially parallel to the axis 26 of the screw 10 and toward the head end of the screw. The alternating pattern of rotationally leading wedge sections 80*a* and rotationally trailing wedge sections 80*b* provides advantageous cutting of material during screw installation, and the immediately adjacent straight projections 82 form intermediate pocket regions 85 for handling of material that is cut, to reduce potential resistance to install as a result of cut material binding against the screw. Here, a series of six diamond projections 80 about the circumference of the screw are provided, but the number could vary (e.g., 3, 4, 5 or 7 or 8). Here, the length L80 of the diamond projection portion of the reaming section is comparable to the length L82 of the straight projection portion of the reaming section (e.g., L80=L82±35%), but variations are possible.

Notably, the diamond projection configuration also results in a circumferential series of axially leading wedge sections 80*c*, which point toward the tip end of the screw, and a circumferential series of axially trailing wedge sections 80*d*, which point toward the head end of the screw. The open side of each axially leading wedge section 80*c* abuts against the open side of one of the axially trailing wedge sections 80*d*. Here, each axially leading wedge section 80*c* is formed by converging and intersecting walls (e.g., 80*a*2 and 80*b*2), and each rotationally trailing wedge section 80*b* is formed by converging and intersecting walls (e.g., 80*b*1 and 80*a*1).

The above-described reaming section 14*c* can also be used in connection with screws having a single lead thread, screws in which the thread(s) have no notches, as well as screws having various head configurations. The above-described reaming section could also be used on screws other than structural screws, such as more traditional wood screws. Embodiments in which the rotationally leading and trailing wedge sections are more curved (e.g., curved in the direction that the wedge sections face) are also possible.

In certain implementations, the structural screw 10, particularly at least the entry end, the shank and the thread include a high lubricity organic topcoat for reducing the driving torque required to install (e.g., by as much as 20% or more compared to known screws). By way of example, an organic topcoat impregnated with a Teflon-based lubricant may be used.

The described thread configuration can make install easier for users and reduce energy consumption for each install. Thus, more screws can be installed for a given battery charge, and more screws can be installed in a given time period. The use of the chamfer at the leading and trailing flank transition zones increases thread strength and/or reduces stresses at the location of joinder to the shank, as compared to typical threads that include only fillets in the transition zones.

The structural screw is designed to be used in numerous applications such as ledger board, heavy duty wood-to-wood, engineered structural lumber such as Parallel Strand Lumber (PSL) and Laminated Veneer Lumber (LVL) without pre-drilling, and for indoor and outdoor application. The structural screw can be used to other wood application such as Truss, Lumber, Timber and Gutter, and, in some cases, can provide one or more of the following benefits: increasing the holding power of structures; eliminating multiple operations for assembly of structures; increasing pull-through strength; increasing the head strength against breaking; increasing thread strength; and/or quicker and easier penetration.

The new generation of structural screws with special thread design can be used in heavy duty construction industry to increase the pull-out strength. Therefore, the installation will provide a better holding power for structures. The screw could have a double lead or triple lead, which increases the speed of drilling screws into the substrate. Another benefit to use double lead or triple lead is to reduce driving time, which can also reduce the overall amount of energy required for driving screw. Any battery-operated hand drill will be able to drive more screws into the substrate for a given battery charge, which reduces the wasted time for contractors to re-charge the battery and reduces the maintenance time of contractors.

The new design of thread uses a smaller and sharper thread profile is to reduce the friction and resistance during driving operation of screws into heavy duty substrates/materials. Also, the new thread profile provides higher strength to keep joined beams together to build stronger structures. The table below provides exemplary threads details for possible embodiments:

| Thread Angle | Transition From Shank to Thread Flanks | Thread Type |
| --- | --- | --- |
| 15-30° (preferably 20-30°) | Chamfer Only | Dual Start/Lead |
| 15-30° (preferably 20-30°) | Chamfer and Fillet(s) | Dual Start/Lead |
| 15-30° (preferably 20-30°) | Complete Fillet Only | Dual Start/Lead |
| 15-30° (preferably 20-30°) | Chamfer Only | Triple Start/Lead |
| 15-30° (preferably 20-30°) | Chamfer and Fillet(s) | Triple Start/Lead |
| 15-30° (preferably 20-30°) | Complete Fillet Only | Triple Start/Lead |

It is to be clearly understood that the above description is intended by way of illustration and example only, is not intended to be taken by way of limitation, and that other changes and modifications are possible. For example, the described reaming section could be implemented on screws having only a single lead thread.

Figure 11:
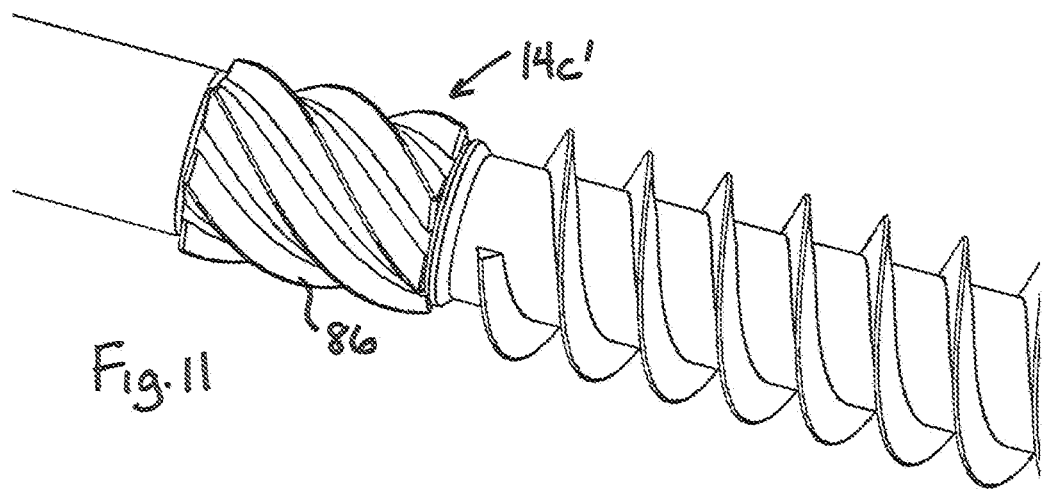
FIG. 11 shows a partial perspective view of an alternative screw embodiment with a different reaming section configuration.

As another example, FIG. 11 shows an alternative embodiment in which the reaming section 14*c*' of the screw has a more conventional set of helical cutting thread-style projections 86. Although not as advantageous from a performance standpoint as the above-described reaming section configuration, screw embodiments of this type, are possible.

Figure 12:
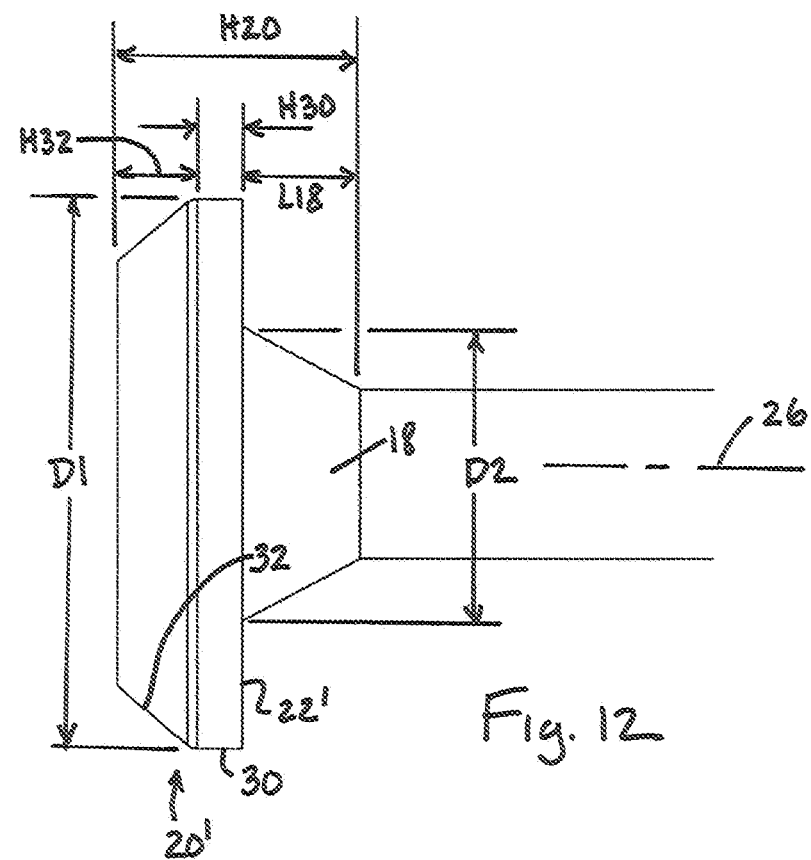
FIG. 12 shows a partial perspective view of an alternative head configuration.

FIG. 12 shows an alternative head configuration for the screw in which the head cap 20' has a head height H20 running in an axial direction (i.e., running parallel to the central axis 26). An annular ledge 22' is defined by an outer diameter D1 and an inner diameter D2, where the neck 18 meets the underside of the head cap 20'. The annular ledge 22' provides a large surface area, relative to the head height H20, for limiting pull through of the screw. Thus, the head cap is of relatively compact size and still provides beneficial pull through performance. By way of example, in one implementation, a ratio of the head height H20 to the outer diameter D1 is less than 0.250, and a ratio of the head height H20 to the inner diameter D2 is greater than 0.350. Other variations are possible. The head cap 20' includes a cylindrical segment 30, with height H30, running from the neck 18 and a frustoconical segment 32, with height H32, that tapers inward moving toward the end face. The frustoconical neck 18 includes an axial length L18, where L18 is slightly smaller than H20 (e.g., L18 is between 85% and 95% of H20).

FIGS. 13A-13B show a further alternative head configuration in which the head cap 20" may have similar D1 and D2 dimensions as described above, and where an integral hex projection 88 is provided for driving the screw. Here, the frustoconical neck section 18' is much shorter in axial length, and a series or radially extending prismatic-shaped nibs 90.

Figure 14A:
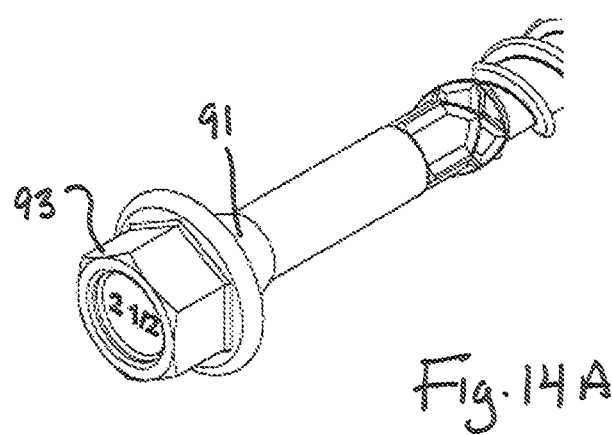
FIGS. 14A-14B show view of another alternative head configuration.
Figure 14B:
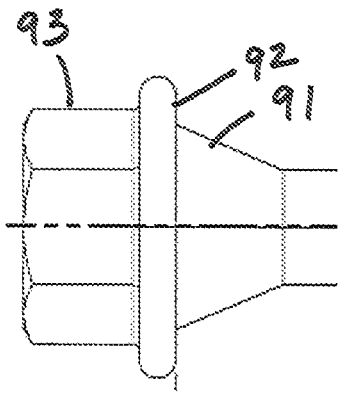

FIGS. 14A-14B show another alternative head configuration with frustoconical neck 91, annular ledge 92, and hex projection 93.

Figure 15A:
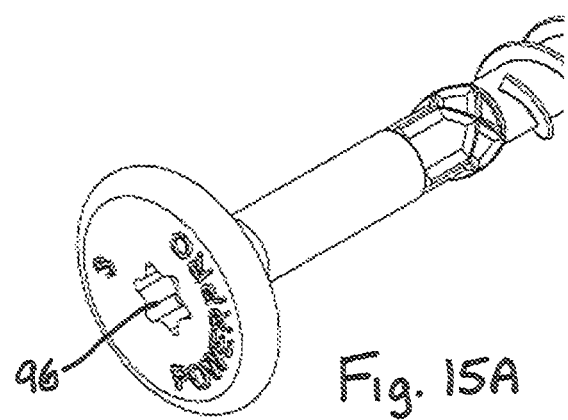
FIGS. 15A-15B show view of another alternative head configuration.
Figure 15B:
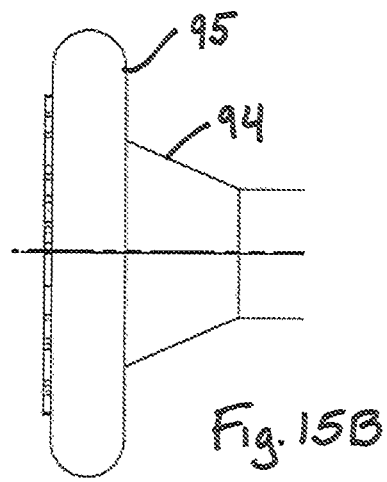

FIGS. 15A-15B show another alternative head configuration with frustoconical neck 94, annular ledge 95 and tool drive recess 96.

Moreover, while a dual start thread is shown and described, a triple start/triple lead thread could also be implemented. As suggested above, the flank transition zone shapes could be chamfer only, chamfer plus fillet(s) or fillets only.

Figure 16A:
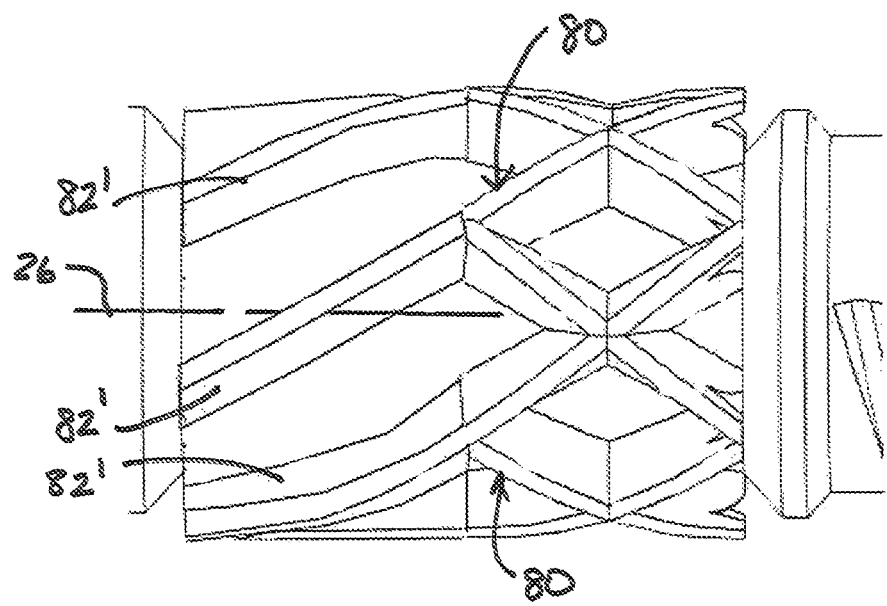
FIGS. 16A and 16B show respective alternative embodiments of the second segment of the reaming section.
Figure 16B:
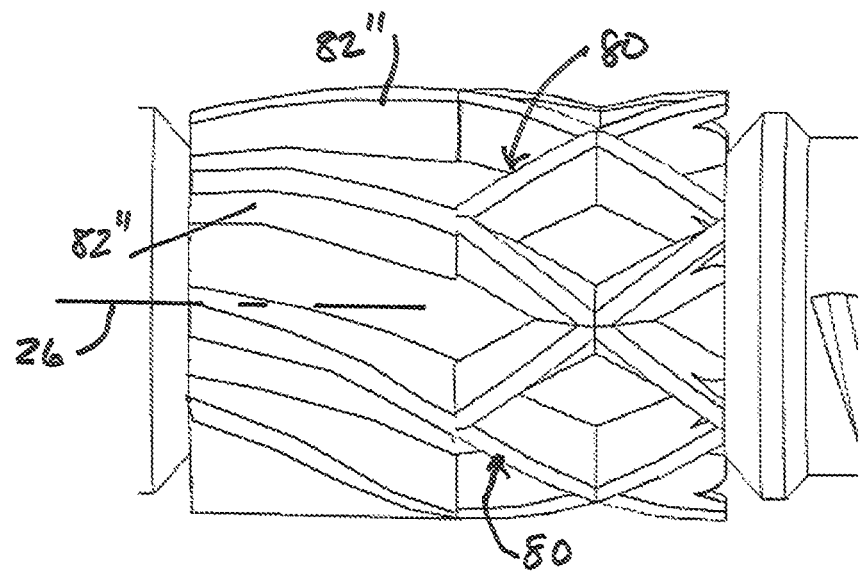

Referring to FIGS. 16A and 16B, alternative embodiments of the reaming section are shown, in which the projections 82', 82" extending from the diamond projections are skewed relative to the axis 26 of the screw. Here, projections 82' run from the diamond projections 80 toward the head of the screw and in a direction that is with to the rotational install direction of the screw, and the projections 82" run from the diamond projections 80 toward the head of the screw and in a direction that is counter to the rotational install direction of the screw. The general path of the projections 82' and 82" may be a helical path.

Figure 17:
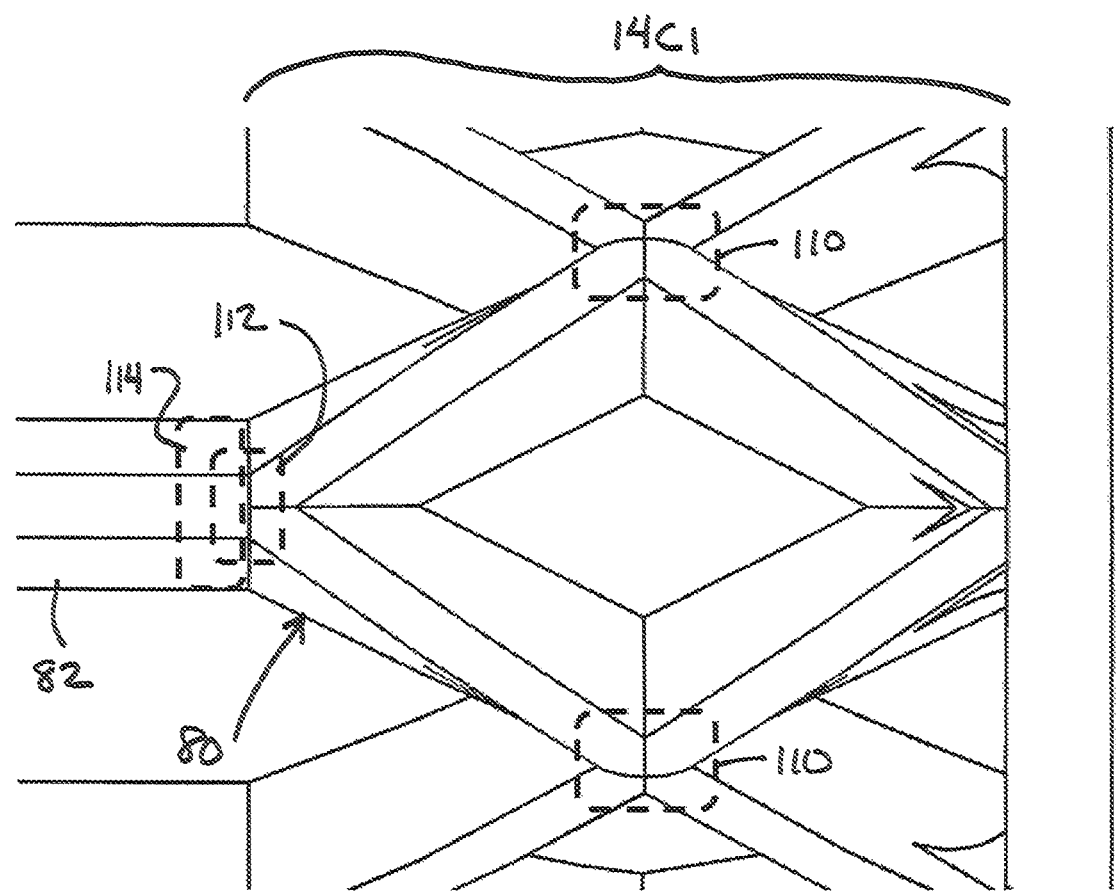
FIG. 17 shows a further alternative embodiment of the reaming section.

Referring to FIG. 17, embodiments in which dashed regions 110 or 112 are slightly recessed relative to the surrounding projection walls, or slightly raised relative to the surrounding projection walls are possible. In both such cases, the projection walls are still interconnected. Moreover, embodiments in which dashed region 114 is provided without any projection wall, to provide a slight gap between the diamonds 80 and the straights 82, are also possible, and in such cases the straights 82 would still be deemed to extend from the first segment 14c1 toward the head end.

Figure 9:
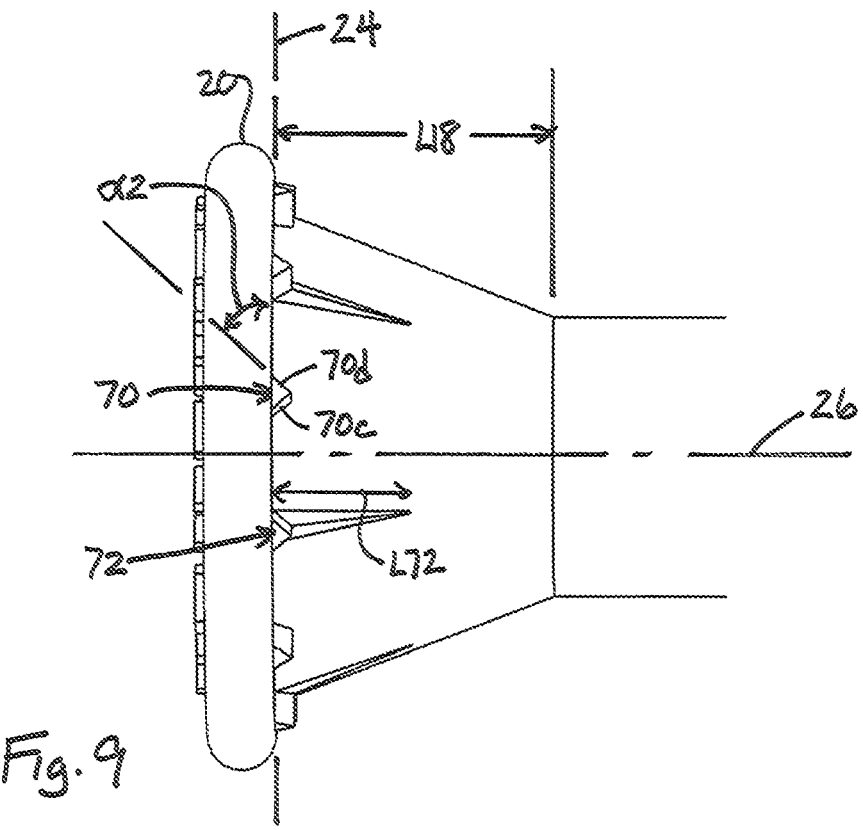
FIG. 9 shows a side view of the head end of the screw.
Figure 10:
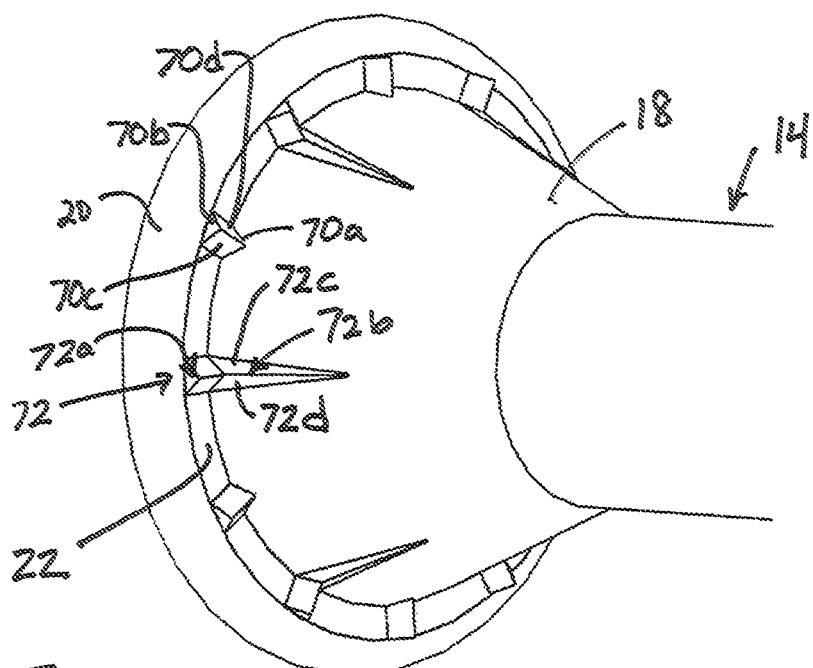
FIG. 10 shows a perspective view of the head end of the screw.
Figure 18A:
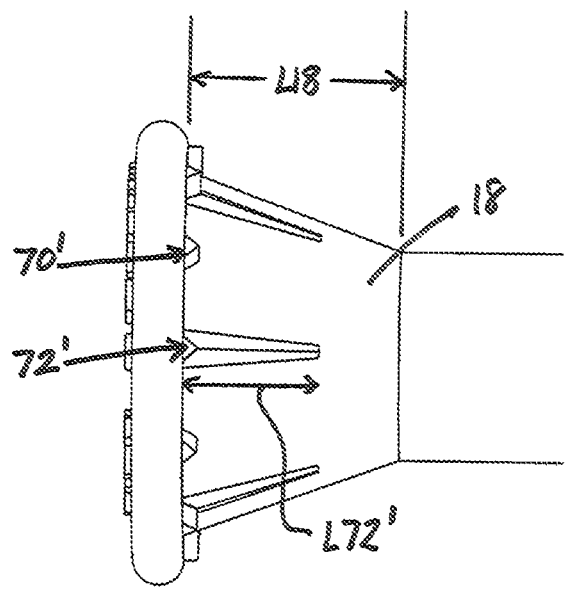
FIGS. 18A-18B show another alternative head configuration.
Figure 18B:
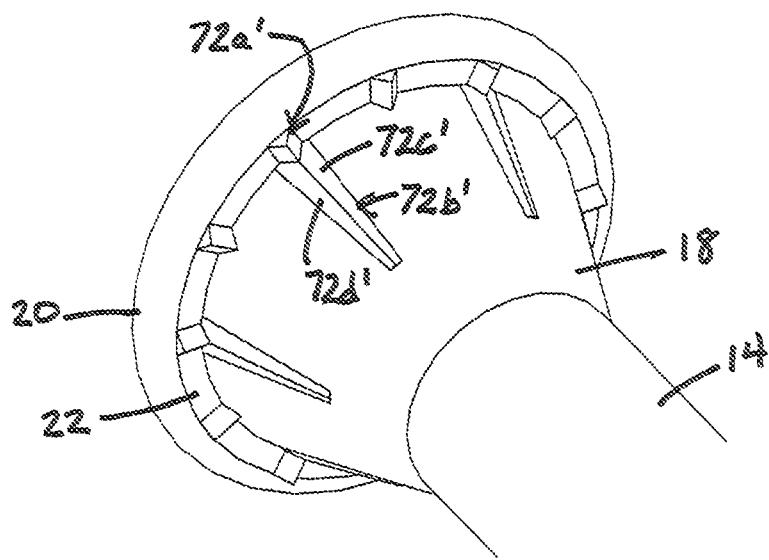

FIGS. 18A-18B show another head configuration that is similar to that of FIGS. 9-10, with nibs 70' and 72' alternating with each other and, here, with a uniform angular spacing between the sequential nib. In the case of each nib 72', the triangular prism structure 72a' is narrower than the abutting portion of the radially extending structure 72b' formed by intersecting sides 72c' and 72d'. In addition, the terminating end of structure 72b' on the screw neck 18 does not come to point. Here, the axial length L72' the nibs 72' is between 55% and 75% of the axial length L18 of the neck 18.

Figure 19A:
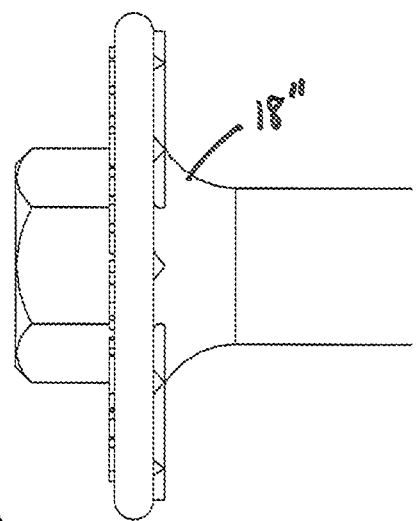
FIGS. 19A-19B show another alternative head configuration.
Figure 19B:
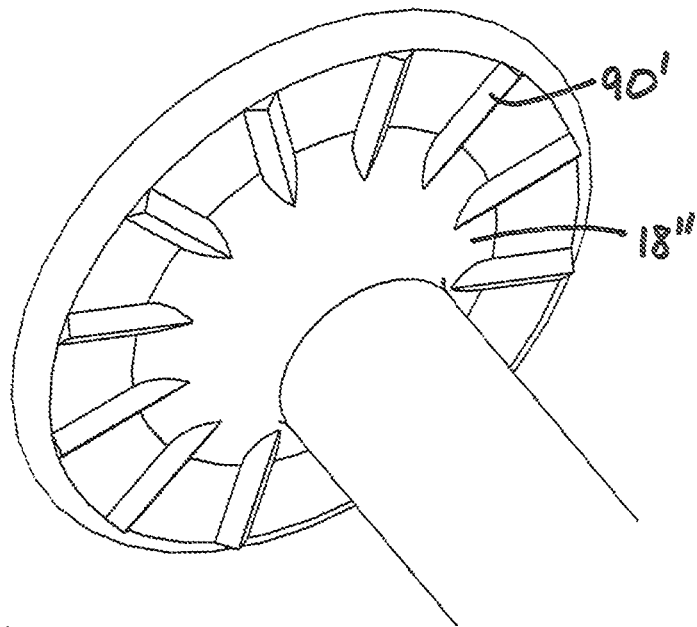

FIGS. 19A-19B show another head configuration that is similar to the head configuration of FIGS. 13A-13B, with radially extending prismatic-shaped nibs 90'. Here, however, the neck section 18" is curved, rather than frustoconical, and the number of nibs 90' is greater.

Figure 20:
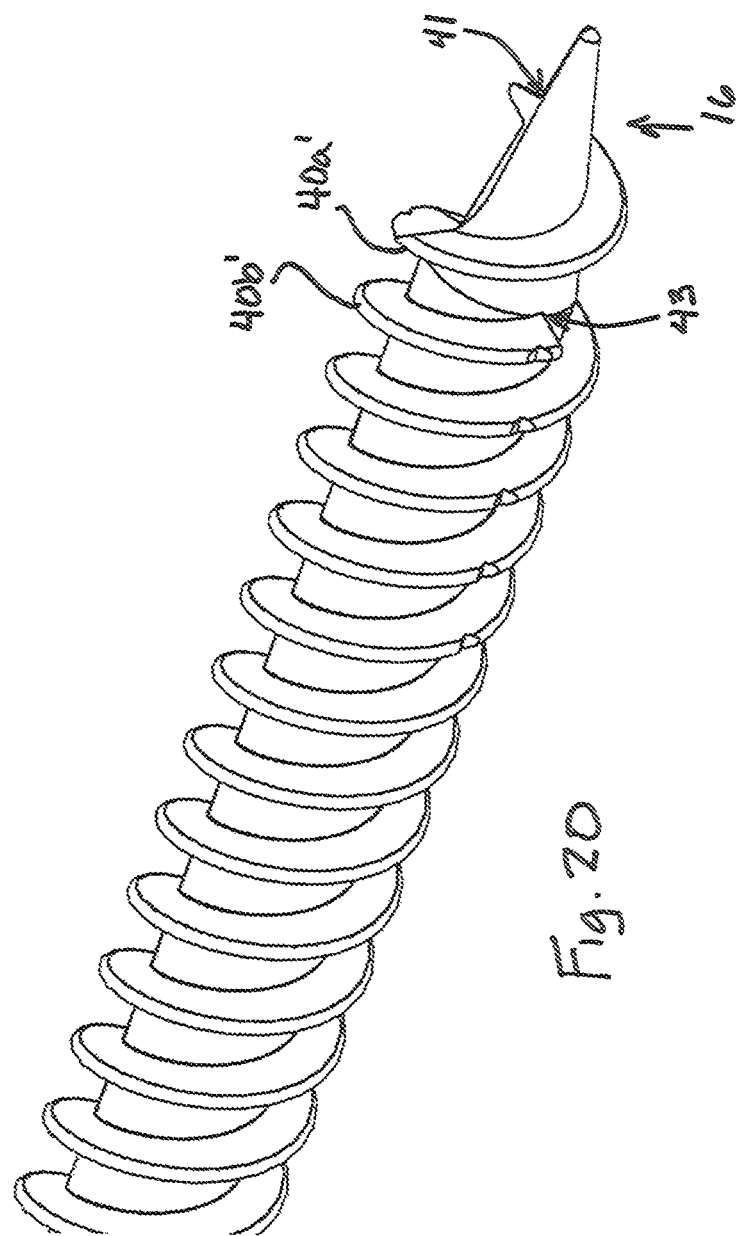
FIG. 20 shows an alternative embodiment of a thread start configuration.

FIG. 20 shows an alternative arrangement for the start configuration of the double lead thread, with only helical thread 40a' starting at a location 41 on the tapered end 16 of the screw, and with helical thread 40b' starting at a location 43 where the tapered end 16 meets the constant diameter core portion of the screw. The result is that the tapered portion of the screw only carries a single lead thread. This arrangement provides the benefit of allowing wood fiber to displace easily, but the speed of driving and pull out strength is still maintained. It is recognized that this start arrangement of the thread could be implemented on any of the above-described screw configuration.

Still other variations are possible.

The invention claimed is:

1. A screw, comprising:
   a head end, a shank and a tapered end, the head end including a tool engaging part, the head end located at a first end of the shank and the tapered end located at a second end of the shank;
   a thread formed along the shank, wherein the thread begins on the tapered end, extends onto the shank and terminates at a first axial location along the shank that is spaced from the head end; and
   a reaming section along the shank and running from proximate to the first axial location and toward the head end, the reaming section including projections thereon, wherein the reaming section comprises a first segment with a repeating pattern of rotationally leading wedge projections and rotationally trailing wedge projections;
   wherein the repeating pattern of rotationally leading wedge projections and rotationally trailing wedge projections also forms a circumferential series of axially leading wedge projections and a circumferential series of axially trailing wedge projections;
   wherein the reaming section further comprises a second segment with a set of circumferentially spaced apart linear projections extending from the first segment toward the head end and in parallel with a central axis of the shank, wherein each linear projection abuts to and extends from one of the axially trailing wedge projections.

2. The screw of claim 1, wherein the repeating pattern of rotationally leading wedge projections and rotationally trailing wedge projections are formed by a set of circumscribing diamond-shaped wall projections that collectively define a recessed diamond-shape internally of the walls.

3. The screw of claim 1, wherein:
   the thread is a multiple start thread formed by at least a first helical thread and a second helical thread,
   and/or
   the thread includes a thread angle of between fifteen degrees and thirty degrees.

4. The screw of claim 3, wherein:
   the thread is a dual start thread formed by the first helical thread and the second helical thread,
   and
   the first helical the thread includes a first leading flank and a first trailing flank that define a first thread angle of between twenty degrees and thirty degrees;
   and
   the second helical the thread includes a second leading flank and a second trailing flank that define a second thread angle of between twenty degrees and thirty degrees;
   and
   the second thread angle is equal to the first thread angle.

5. The screw of claim 3, wherein the thread includes a leading flank, a trailing flank and a peripheral edge joining the leading flank and the trailing flank, wherein the thread includes an initial axial segment comprising multiple thread turns and along which the peripheral edge includes a plurality of notches and a following axial segment comprising multiple thread turns and along which the peripheral edge lacks any notches, wherein the initial segment begins on the tapered end and runs to a second axial location along the shank that is between the tapered end and the first axial location, wherein the plurality of notches along the initial axial segment are formed with an asymmetric spacing pattern through each thread turn of the initial axial segment.

6. The screw of claim 1, wherein a radial height of the axially trailing wedge projections, relative to the central axis, is substantially the same as a radial height of the linear projections, relative to the central axis.

7. A screw, comprising:
  a head end, a shank and a tapered end, the head end including a tool engaging part, the head end located at a first end of the shank and the tapered end located at a second end of the shank;
  a thread formed along the shank, wherein the thread begins on the tapered end, extends onto the shank and terminates at a first axial location along the shank that is spaced from the head end; and
  a reaming section along the shank and running from proximate to the first axial location and toward the head end, the reaming section including projections thereon, wherein the reaming section comprises a first segment with a repeating pattern of rotationally leading wedge projections and rotationally trailing wedge projections;
  wherein the repeating pattern of rotationally leading wedge projections and rotationally trailing wedge projections also forms a circumferential series of axially leading wedge projections and a circumferential series of axially trailing wedge projections;
  wherein the reaming section further comprises a second segment with a set of circumferentially spaced apart helical projections extending from the first segment toward the head end, wherein all helical projections of the second segment extend in a same helical direction, and wherein each helical projection abuts to and extends from one of the axially trailing wedge projections.

8. The screw of claim 7, wherein a radial height of the axially trailing wedge projections, relative to the central axis, is substantially the same as a radial height of the helical projections, relative to the central axis.

9. A screw, comprising:
  a head end, a shank and a tapered end, the head end including a tool engaging part, the head end located at a first end of the shank and the tapered end located at a second end of the shank;
  a thread formed along the shank, wherein the thread begins on the tapered end, extends onto the shank and terminates at a first axial location along the shank that is spaced from the head end;
  wherein the thread includes a leading flank, a trailing flank and a peripheral edge joining the leading flank and the trailing flank, wherein the thread includes an initial axial segment comprising multiple thread turns and along which the peripheral edge includes a plurality of notches and a following axial segment comprising multiple thread turns and along which the peripheral edge lacks any notches, wherein the initial segment begins on the tapered end and runs to a second axial location along the shank that is between the tapered end and the first axial location, wherein the plurality of notches along the initial axial segment are formed with an asymmetric spacing pattern through each thread turn of the initial axial segment;
  wherein the asymmetric spacing pattern is defined by first, second and third notches through each three-hundred sixty degree turn of the thread, wherein a center of the first notch is spaced from a center of the second notch by between one-hundred forty and one-hundred and sixty degrees, wherein a center of the second notch is spaced from a center of the third notch by between one-hundred forty and one-hundred and sixty degrees, and wherein a center of the third notch is spaced from the center of the first notch by between forty and eighty degrees.

10. The screw of claim 9, wherein the thread is a dual start thread formed by the first helical thread and the second helical thread, wherein the first helical thread starts on the tapered end, wherein the second helical thread starts on a portion of the shank that is of constant diameter, such that the tapered end only carries the first helical thread.

11. The screw of claim 9, further comprising:
  a reaming section along the shank and running from proximate to the first location and toward the head end, the reaming section including projections thereon.

12. The screw of claim 11, wherein the reaming section comprises a first segment with a repeating pattern of rotationally leading wedge projections and rotationally trailing wedge projections, wherein the reaming section further comprises a second segment with a set of circumferentially spaced apart linear projections extending from the first segment toward the head end, wherein the repeating pattern of rotationally leading wedge projections and rotationally trailing wedge projections are formed by a set of circumscribing diamond-oriented wall projections that collectively define a recessed diamond-shape internally of the walls.

13. The screw of claim 12, wherein the repeating pattern of rotationally leading wedge projections and rotationally trailing wedge projections also forms a circumferential series of axially leading wedge projection and a circumferential series of axially trailing wedge projections.

14. A screw, comprising:
  a head end, a shank and a tapered end, the head end including a tool engaging part, the head end located at a first end of the shank and the tapered end located at a second end of the shank;
  a thread formed along the shank, wherein the thread begins on the tapered end, extends onto the shank and terminates at a first axial location along the shank;
  wherein the thread includes a leading flank and a trailing flank that define the thread angle of between fifteen degrees and thirty degrees, wherein a leading flank transition zone from the shank to the leading flank includes a leading chamfer for strengthening the thread against failure, wherein the leading chamfer defines a leading chamfer angle of between twenty-five degrees and thirty-five degrees relative to a central axis of the shank, wherein a trailing flank transition zone from the shank to the trailing flank includes a trailing chamfer for strengthening the thread against failure, wherein the trailing chamfer defines a trailing chamfer angle of between twenty-five degrees and thirty-five degrees relative to the central axis of the shank.

15. The screw of claim 14, wherein the head end includes a frustoconical neck running from the first end of the shank to a head cap, wherein the head cap defines an annular ledge facing the tapered end and lying in a plane that is perpendicular to the central axis of the shank, wherein a plurality of nibs run from the neck to the annular face, including first nibs of a first configuration and second nibs of a second configuration, the first and second nibs alternating with each other.

16. The screw of claim 15, wherein a uniform angular spacing is provided between the first nibs and second nibs.

17. The screw of claim 15, wherein the head end includes a frustoconical neck running from the first end of the shank to a head cap, wherein the head cap has a head height running in an axial direction, wherein the annular ledge includes an outer diameter and an inner diameter, wherein a ratio of the head height to the outer diameter is less than 0.250, and wherein a ratio of the head height to the inner diameter is greater than 0.350.

18. A structural screw usable in multiple different substrates/materials, comprising:
a head end, a shank and a tapered end, the head end including a tool engaging part, the head end located at a first end of the shank and the tapered end located at a second end of the shank;
a thread formed along the shank, wherein the thread begins on the tapered end, extends onto the shank and terminates at a first axial location along the shank that is spaced from the head end, wherein:
the thread is a multiple start thread formed by at least a first helical thread and a second helical thread, and
the first helical thread includes a first leading flank and a first trailing flank that define a first thread angle of between fifteen degrees and thirty degrees; and
the second helical thread includes a second leading flank and a second trailing flank that define a second thread angle of between fifteen degrees and thirty degrees; and
wherein the first helical thread includes a first peripheral edge, and a first initial axial segment comprising multiple thread turns and along which the first peripheral edge includes a first plurality of notches, and a first following axial segment comprising multiple thread turns and along which the first peripheral edge lacks any notches, wherein the first initial segment begins on the tapered end, wherein the first plurality of notches along first the initial axial segment are formed with a first asymmetric spacing pattern through each thread turn of the first initial axial segment; and
wherein the second helical thread includes a second peripheral edge, and a second initial axial segment comprising multiple thread turns and along which the second peripheral edge includes a second plurality of notches, and a second following axial segment comprising multiple thread turns and along which the second peripheral edge lacks any notches, wherein the second initial segment begins on the tapered end, wherein the second plurality of notches along the second initial axial segment are formed with a second asymmetric spacing pattern through each thread turn of the second initial axial segment;
wherein the first asymmetric spacing pattern is defined by first, second and third notches through each three-hundred sixty degree turn of the first helical thread, wherein a center of the first notch is spaced from a center of the second notch by between one-hundred forty and one-hundred and sixty degrees, wherein a center of the second notch is spaced from a center of the third notch by between one-hundred forty and one-hundred and sixty degrees, and wherein a center of the third notch is spaced from the center of the first notch by between forty and eighty degrees;
wherein the second asymmetric spacing pattern is defined by first, second and third notches through each three-hundred sixty degree turn of the second helical thread, wherein a center of the first notch of the second helical thread is spaced from a center of the second notch of the second helical thread by between one-hundred forty and one-hundred and sixty degrees. wherein a center of the second notch of the second helical thread is spaced from a center of the third notch of the second helical thread by between one-hundred forty and one-hundred and sixty degrees, and wherein a center of the third notch of the second helical thread is spaced from the center of the first notch of the second helical thread by between forty and eighty degrees.

19. The structural screw of claim 18, further comprising:
a reaming section along the shank and running from proximate to the first location and toward the head end, the reaming section including projections thereon;
wherein the reaming section comprises a first segment with a repeating pattern of leading wedge defining wall projections and trailing wedge defining wall projections;
wherein the reaming section further comprises a second segment with:
a set circumferentially spaced apart linear projections extending from the first segment toward the head end, or
a set circumferentially spaced apart helical projections extending from the first segment toward the head end.

* * * * *